(12) United States Patent
Kibler

(10) Patent No.: US 11,292,377 B2
(45) Date of Patent: Apr. 5, 2022

(54) SUPPORTIVE BELLY PAD FOR A ROUNDED TRAILER

(71) Applicant: MAC TRAILER MANUFACTURING, INC., Alliance, OH (US)

(72) Inventor: Scott A. Kibler, Kensington, OH (US)

(73) Assignee: MAC Trailer Manufacturing, Inc., Alliance, OH (US)

( * ) Notice: Subject to any disclaimer, the term of this patent is extended or adjusted under 35 U.S.C. 154(b) by 210 days.

(21) Appl. No.: 16/784,832

(22) Filed: Feb. 7, 2020

(65) Prior Publication Data

US 2020/0171995 A1   Jun. 4, 2020

Related U.S. Application Data

(60) Continuation of application No. 15/716,994, filed on Sep. 27, 2017, now Pat. No. 10,661,694, which is a continuation-in-part of application No. 15/073,142, filed on Mar. 17, 2016, now abandoned, which is a division of application No. 13/954,512, filed on Jul. 30, 2013, now Pat. No. 9,315,136.

(51) Int. Cl.
*B60P 1/16* (2006.01)
*B60P 1/28* (2006.01)
*B62D 25/20* (2006.01)

(52) U.S. Cl.
CPC ............ *B60P 1/28* (2013.01); *B60P 1/16* (2013.01); *B60P 1/283* (2013.01); *B62D 25/2054* (2013.01)

(58) Field of Classification Search
CPC .... B60P 1/28; B60P 1/283; B60P 1/16; B62D 25/2054
USPC ...................................... 298/17 R, 22 R, 22 P
See application file for complete search history.

(56) References Cited

U.S. PATENT DOCUMENTS

| | | | |
|---|---|---|---|
| 1,883,936 A | 10/1932 | Kerr | |
| 3,003,818 A | 10/1961 | Merchant | |
| 3,093,254 A | 6/1963 | Sammarco | |
| 3,447,834 A | 6/1969 | Grosse-Rhode | |
| 3,844,616 A | 10/1974 | Acker | |
| 4,058,343 A | 11/1977 | Maxon, III | |
| 4,969,690 A * | 11/1990 | Smith | B60P 3/42 298/17 R |
| 5,460,431 A | 10/1995 | McWilliams | |
| 6,210,088 B1 | 4/2001 | Crosby | |
| 6,854,789 B2 | 2/2005 | Kloepfer | |
| 7,055,912 B2 | 6/2006 | Luscombe | |
| 2005/0017568 A1* | 1/2005 | Ahlberg | B60P 1/162 298/22 P |
| 2009/0322058 A1 | 12/2009 | Shannon | |

(Continued)

*Primary Examiner* — Stephen T Gordon
(74) *Attorney, Agent, or Firm* — Sand, Sebolt & Wernow Co., LPA

(57) ABSTRACT

A structurally supportive belly pad is connected to a rounded trailer and configured to support the same near the rear end of the trailer. The belly pad may be arcuately curved complementary to the curvature of the rounded trailer. However, if the belly pad were laid flat, it includes a pair of parallel legs aligned in a generally longitudinal direction with a plurality of transverse ribs extending therebetween. The shape of the belly pad is configured to provide structural support for the trailer which is beneficial especially when the trailer is raised and lowered, typically through hydraulic mechanisms.

19 Claims, 7 Drawing Sheets

(56) References Cited

U.S. PATENT DOCUMENTS

2011/0233986 A1* 9/2011 Obermeyer .............. B60P 1/28
                                              298/22 R
2015/0217668 A1   8/2015 Kita et al.

* cited by examiner

FIG.5

SUPPORTIVE BELLY PAD FOR A ROUNDED TRAILER

CROSS REFERENCE TO RELATED APPLICATIONS

This application is a continuation of U.S. patent application Ser. No. 15/716,994 filed Sep. 27, 2017, which is a continuation-in-part of prior co-pending U.S. patent application Ser. No. 15/073,142, filed Mar. 17, 2016, which is a divisional of U.S. patent application Ser. No. 13/954,512, filed Jul. 30, 2013, now U.S. Pat. No. 9,315,136, the entire disclosures of which are incorporated herein by reference.

BACKGROUND

Technical Field

The present disclosure relates generally to trailers. More particularly, the present disclosure relates to rounded trailers. Specifically, the present disclosure relates to rounded or half-round trailers having a supportive "belly pad" which is formed as a structural support beneath the outer surface of the trailer.

Background Information

Trailers are known to carry bulk materials when towed by a towing vehicle. Typically, the trailers include a lifting system (often hydraulically operated) to tilt/raise the trailer in order the dump the bulk materials carried thereby.

A trailer body on a conventional half round or full round tank trailer is typically fabricated from metallic sections of arcuate panels welded together. Sometimes there may be a frame to support the panels of the half round trailer. Other times, the half round trailer may be considered a frameless trailer.

SUMMARY

Issues continue to exist with providing sufficient structural support to half round or full round tank trailers inasmuch as they are expected to haul heavy loads, but sometimes may lack structural integrity in regions where the panels have been welded together and are not supported by a frame or other bracket. Thus, a need continues to exist for strengthening and supporting a rounded trailer. The present disclosure addresses these and other issues.

In one aspect, an embodiment of the present disclosure may provide a structurally supportive member for attachment with a trailer, wherein when laid flat prior to installation on the trailer the supportive member comprises: a central longitudinal axis defining a longitudinal direction extending from a forward end to a rear end; a first leg having a first end and a second end; a second leg having a first end and a second end; wherein the first and second legs are parallel and the central longitudinal axis extends centrally between the first and second legs; a transverse first rib extending between first leg and the second leg; and a longitudinal extension connected to the first rib and extending along the longitudinal axis.

In another aspect, an embodiment of the present disclosure may provide a trailer comprising: a trailer body having a concave inner surface opposite a convex outer surface aligned along a longitudinal axis extending from a forward end to a rear end of the trailer body; and a supportive belly pad connected to the outer surface proximate the rear end of the trailer body, wherein the supportive belly pad includes a pair of longitudinally extending parallel legs and a plurality of transverse ribs orthogonally intersecting the longitudinal axis, wherein the belly pad is arcuately curved complementary to the convex outer surface.

In yet another aspect, an embodiment the present disclosure may provide a half round trailer comprising: a generally semi-cylindrical trailer body oriented along a longitudinal axis having upwardly facing top opening, and an upwardly facing concave inner surface opposite a downwardly facing convex outer surface; and a supportive belly pad connected to the outer surface proximate the longitudinal center of the trailer body, wherein the supportive belly pad includes a pair of parallel legs and a plurality of transverse ribs orthogonally intersecting the longitudinal axis. This or another embodiment may further include a transverse first rib on the supportive belly pad extending between the pair of parallel legs; a transverse second rib on the supportive belly pad extending between the pair of parallel legs; a transverse third rib on the supportive belly pad extending between the pair of parallel legs; and a transverse fourth rib on the supportive belly pad extending between the pair of parallel legs. This or another embodiment may further include a longitudinal extension extending in a cantilevered manner from the first rib along the longitudinal axis. This or another embodiment may further include a longitudinally aligned width of the first rib that is greater than a longitudinally aligned width of the second rib. This or another embodiment may further include a longitudinally aligned width of the first rib that is greater than a longitudinally aligned width of the third rib. This or another embodiment may further include a longitudinally aligned width of the first rib that is greater than a longitudinally aligned width of the fourth rib. This or another embodiment may further include a transversely extending concave edge on the fourth rib. This or another embodiment may further include wherein the third rib is offset closer to the second rib than the fourth rib. This or another embodiment may further include a longitudinal first interval distance between the first rib and the second rib; a longitudinal second interval distance between the second rib and the third rib; a longitudinal third interval distance between the third rib and the fourth rib; wherein the second interval distance is less than the first interval distance and less than the third interval distance. This or another embodiment may further include wherein the second interval distance is less than the third interval distance. This or another embodiment may further include a transversely aligned length of each one of the plurality of ribs, wherein the transversely aligned length of each one of the plurality of ribs is greater than a transversely aligned width of each one of the pair of parallel legs. This or another embodiment may further include a transverse first rib on the supportive belly pad offset from a first end thereof; a transverse second rib on the supportive belly pad offset from a second end thereof.

In yet another aspect, an embodiment of the present disclosure may provide a structurally supportive member, which may also be referred to as a belly pad, for attachment with a trailer, that when laid flat comprises: a central longitudinal axis; a longitudinal first leg having a first end and a second end; a longitudinal second leg having a first end and a second end; wherein the first and second legs are parallel and the central longitudinal axis extends centrally between the first and second legs; a transverse first plane perpendicularly intersecting the longitudinal axis, wherein the respective first ends of the first and second legs lie along the first plane; a transverse second plane perpendicularly intersecting the longitudinal axis, wherein the respective second ends of the first and second legs lie along the second plane; a transverse first rib extending between first leg and the second leg, wherein the first rib is offset from the first plane; a longitudinal extension extending in a cantilevered manner towards the second plane along the longitudinal axis; a transverse second rib extending between first leg and the second leg; a third transverse rib extending between first leg and the second leg; a fourth transverse rib extending between first leg and the second leg, wherein the fourth rib is offset from the second plane; and wherein the second and third ribs are intermediate the first and fourth ribs.

In yet another aspect, an embodiment of the present disclosure may provide a trailer comprising: a trailer body having an inner surface opposite a convex outer surface aligned along a longitudinal axis extending from a forward end to a rear end of the trailer body; and a supportive belly pad connected to the outer surface proximate the rear end of the trailer body, wherein the supportive belly pad includes a pair of longitudinally extending parallel legs and a plurality of transverse ribs orthogonally intersecting the longitudinal axis, wherein the belly pad is arcuately curved complementary to the convex outer surface, and the plurality of transverse ribs are offset from respective ends of the pair of longitudinally extending parallel legs.

In yet another aspect, an embodiment of the present disclosure may provide a structurally supportive member for attachment with a trailer, wherein when laid flat prior to installation on the trailer the supportive member comprises: a longitudinal axis defining a longitudinal direction from a forward end to a rear end of the supportive member; a first leg having a first end and a second end; a second leg having a first end and a second end; wherein the first and second legs are parallel and the longitudinal axis is between the first and second legs; a transverse first rib extending between first leg and the second leg; and a longitudinal extension connected to the first rib and extending along the longitudinal axis.

In another aspect, the present disclosure may provide a structurally supportive belly pad connected to a rounded trailer and configured to support the same near the rear end of the trailer. The belly pad may be arcuately curved complementary to the curvature of the rounded trailer. However, if the belly pad were laid flat, it includes a pair of parallel legs aligned in a generally longitudinal direction with a plurality of transverse ribs extending therebetween. The shape of the belly pad is configured to provide structural support for the trailer which is beneficial especially when the trailer is raised and lowered, typically through hydraulic mechanisms.

BRIEF DESCRIPTION OF THE SEVERAL VIEWS OF THE DRAWINGS

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

FIG. 5 is a top perspective view of the supportive member or belly pad after being formed into a generally arcuate shape.

Similar numbers refer to similar parts throughout the drawings.

DETAILED DESCRIPTION

At the outset, it should be appreciated that like drawing numbers on different drawing views identify identical, or functionally similar, structural elements of the invention. While the present disclosure is described with respect to what is presently considered to be the exemplary embodiments, it is to be understood that the invention as claimed is not limited to the disclosed aspects.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
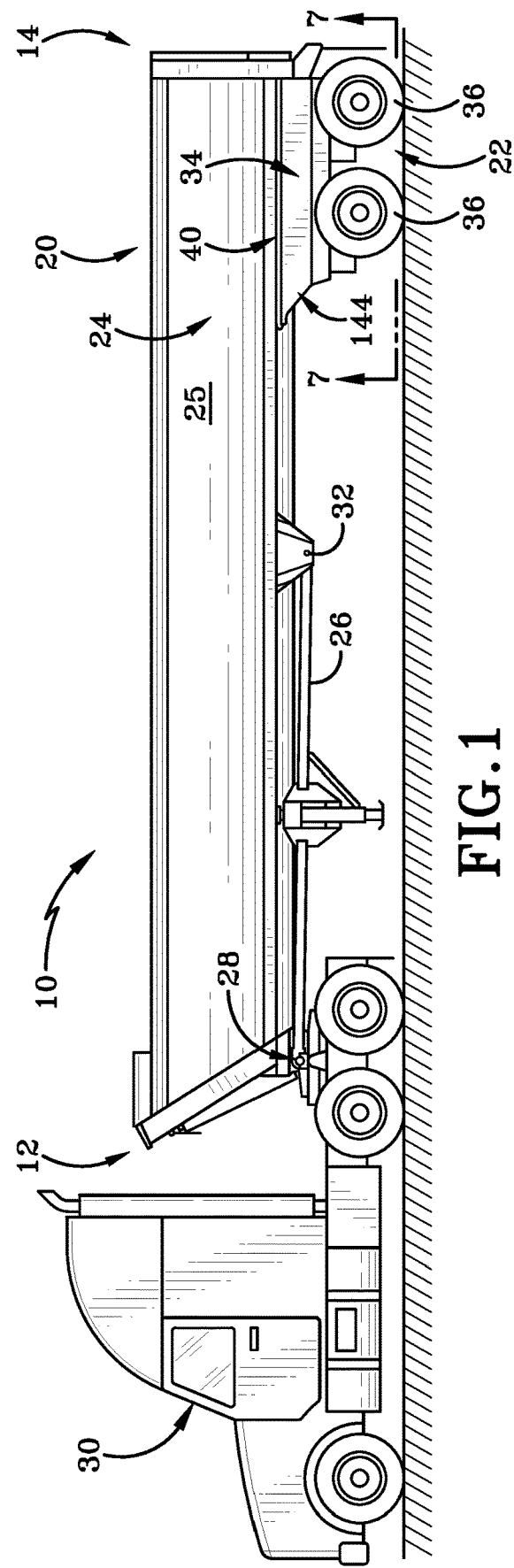
FIG. 1 is an assembled side elevation view of a rounded trailer and a supportive member or belly pad in accordance with the present disclosure.

As depicted in FIG. 1, a half round trailer in accordance with the present disclosure is shown generally at 10; however, a full round trailer is possible as well. Trailer 10 includes a front end 12 and a rear end 14 defining a longitudinal direction therebetween, a left side 16 (FIG. 7) and a right side 18 (FIG. 7) defining a transverse or axial direction therebetween, and a top 20 and a bottom 22 defining a vertical direction therebetween.

Trailer 10 may be a half-round trailer such that the top 20 is substantially open to the environment defining an opening to a containment volume defined by an arcuately concave upwardly facing inner surface of a trailer body 24. The trailer body 24 may include an arcuately convex downwardly facing bottom surface 25. Near the longitudinal midpoint of the trailer may exist a transversely extending pivot axis 32 about which a lift arm 26 may pivot. Lift arm 26 may connect with a fifth wheel connection 28 on truck 30 so as to enable the half round trailer to be towed.

A trolley assembly 34 may support the trailer body 24 from below adjacent rear end 14. The trolley assembly 34 is operatively connected with ground engaging wheels 36.

Figure 2:
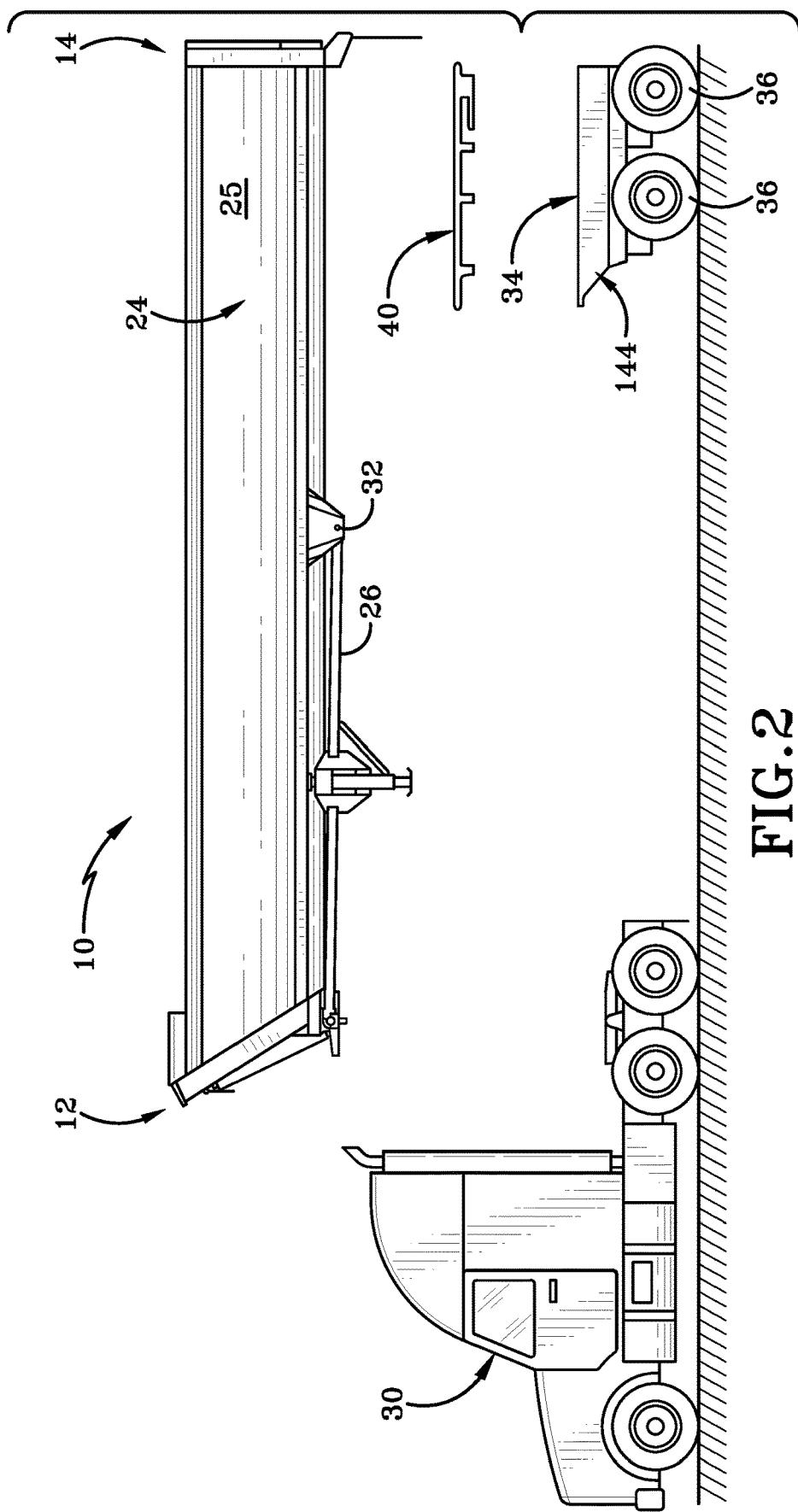
FIG. 2 is an exploded side elevation view depicting the positioning of the supportive member between a trailer body and a trolley assembly.

As depicted in FIG. 2 and in accordance with an aspect of the present disclosure, a structurally supportive member, which may also be referred to as a belly pad, 40 is positioned between the trolley assembly 34 and the trailer body 24 adjacent the rear end 14. Supportive member 40 is configured to structurally support and strengthen the connection to the trolley assembly to the trailer body 24. Furthermore, as will be described in greater detail below, the supportive member 40 is shaped in a manner which enables various components of the trolley assembly 34 (including suspension components, such as a trailing arm suspension) to be mounted to the supportive member 40.

Figure 3:
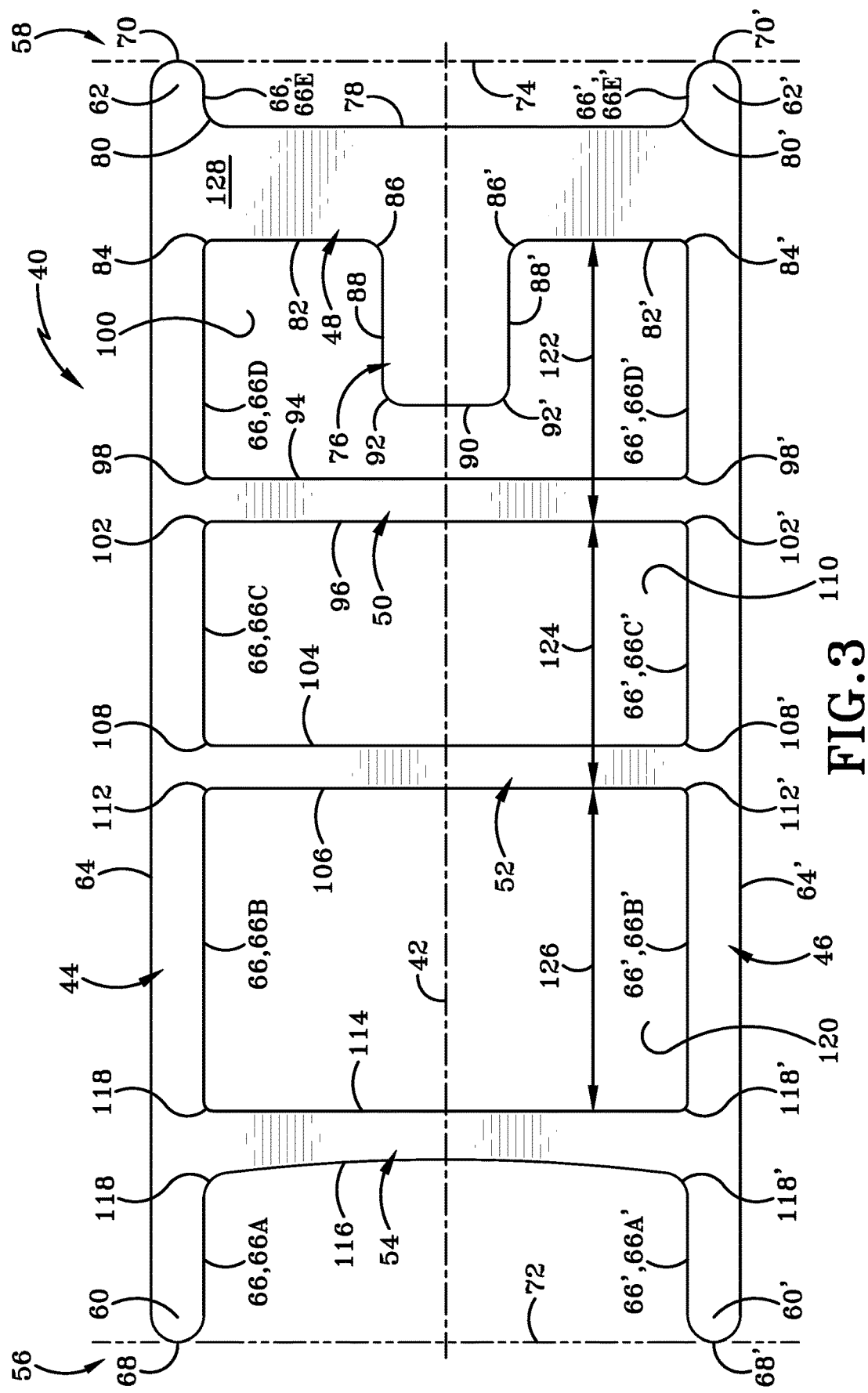
FIG. 3 is a top plan view of the supportive member or belly pad when laid flat and prior to be being formed into a generally arcuate shape for installation on the trailer body.

FIG. 3 depicts a top plan view of the supportive member 40 when the supportive member is laid flat prior to its rolling into an arcuate profile and prior to installation on the trailer 10 between trailer body 24 and trolley assembly 34, which will be described in greater detail below. Supportive member 40 includes a central longitudinal axis 42, a first leg 44, a second leg 46, a transverse first rib 48, a transverse second rib 50, a transverse third rib 52, and a transverse fourth rib 54. Supportive member 40 includes a forward end 56 spaced longitudinally forward from a rear end 58. The longitudinal axis 42 defines a longitudinal direction from the forward end 56 to the rear end 58 of the supportive member 40.

The first leg 44 includes a first end 60 and a second end 62. The first end 60 is associated with the forward end 56 of supportive member 40. The second end 62 is associated with the rear end 58 of supportive member. As such, the first end 60 is positioned forwardly from the second end 62 relative to the trailer 10. The first leg 44 is generally elongated between first end 60 and second end 62. In one example, first leg 44 has substantially parallel edges extending longitudinally from the first end 60 to the second end 62 which substantially bound first and second surface of the first leg 44. An outer edge 64 of first leg 44 is linear from the first end 60 to the second end 62. In one example, the outer edge 64 is continuous and uninterrupted. The first leg 44 is offset from central longitudinal axis 42 so as to position the outer edge 64 at a distance farthest from axis 42 relative to other portions of first leg 44. First leg 44 may further include an inner edge 66 which is offset parallel from outer edge 64 and closer to axis 42 from outer edge 64. The inner edge 66 may be divided into a plurality of sections or portions. In one example, the inner edge 66 may include a first portion 66A, a second portion 66B, a third portion 66C, a fourth portion 66D, and a fifth portion 66E. The first portion 66A is associated with the forward end 56 and the fifth portion 66E is associated with the rear end 58. The second portion 66B, the third portion 66C, and the fourth portion 66D are arranged sequentially from the forward end to the rear end. Collectively, the inner edge 66 may be interrupted by the ribs 48, 50, 52, and 54 so as to create the first portion, second portion, third portion, fourth portion, and fifth portion of inner edge 66. The first portion 66A of inner edge 66 is connected with outer edge 64 via a forward facing rounded edge 68 defining the forward end 56. The fifth portion 66E of inner edge 66 is connected with the outer edge 64 via a rearwardly facing rounded rear edge 70 which defines the rear end 58. Notably, the second end 62 of first leg 44 which is defined by the rear rounded edge 70 and the fifth portion 66E of inner edge 66 is positioned rearward from the first rib 48. Stated otherwise, no portion of transverse rib 48 is coplanar with the fifth portion 66E or the rear rounded edge 70. In one particularly example, the longitudinally aligned width of the fifth portion 66E is in a range from about two inches to about twenty four inches which is configured to purposefully position the first rib 48 forwardly from the rear end 58 of the supportive member 40.

With continued reference to FIG. 3, the second leg 46 is structurally identical to first leg 44 but is positioned on an equally opposite side of axis 42. Because of the mirrored identical structure of second leg 46 to first leg 44, the components that define second leg 46 are identified with prime (') indices or identifiers. It is to be understood that, for brevity, their description is not repeated as it is the same as described above with respect to the first leg 44. For example, second leg 46 includes first end 60', second end 62', outer edge 64', inner edge 66' (and its first portion 66A', second portion 66B', third portion 66C', fourth portion 66D', and fifth portion 66E'), forward rounded edge 68', and rearward rounded edge 70' which are arranged and structured in an identical manner as described above to their non-primed equivalents of the first leg 44.

The first leg 44 is parallel to the second leg 46 on opposite sides of the central axis 42. Stated otherwise, the central longitudinal axis 42 extends centrally between the first leg 44 and the second leg 46. The respective inner edges 66, 66' on the first and second legs 44, 46 are parallel to each other. The respective outer edges 64, 64' on the first and second legs 44, 46 are parallel to each other.

The forward rounded edges 68, 68' lie along the same transverse plane which perpendicularly intersects the central axis 42. More particularly, a transverse first plane 72 perpendicularly intersects axis 42. The apices of the respective forward rounded edges 68, 68' are coplanar on first plane 72. The rear rounded edges 70, 70' lie along the same transverse plane which perpendicularly intersects the central axis 42. More particularly, a transverse second plane 74 perpendicularly intersects axis 42. The apices of the respective rear rounded edges 70, 70' are coplanar on second plane 74. The first rib 48 is offset forwardly from the second plane 74 such that no portion of first rib 48 lies along second plane 74. Stated otherwise, first rib 48 is positioned forwardly from the second plane 74 which positions first rib 48 forwardly from the rear end 58 of supportive member 40.

The first rib 48 extends transversely between rigid connections with the first leg 44 and the second leg 46. The first rib 48 intersects longitudinal central axis 42 in a generally perpendicular manner. A longitudinal extension member, which also may be referred to simply as a longitudinal extension, extends forwardly from the first rib 48 along the longitudinal axis. More particularly, a longitudinal extension 76 is centered along axis 42 and extends forwardly in a cantilevered manner from a rigid connection with first rib 48.

With continued reference to the first rib 48 and the longitudinal extension 76, a plurality of edges are connected together to form a generally T-shaped uniform member of the first rib 48 and longitudinal extension 76. For example, transversely extending rear edge 78 extends between the first leg 44 and the second leg 46. More particularly, the rear edge 78 is connected with fifth portion 66E via a rounded concave fillet 80 and extends perpendicularly across longitudinal axis 42 to a concave rounded fillet 80' connection with fifth portion 66E'. Rear edge 78 is spaced from first plane 74 a longitudinal distance in a range from about three inches to about nine inches. In another particular embodiment, the longitudinal distance of rear edge 78 from first plane 74 is about seven inches. The first rib 48 includes a leading edge 82 which extends perpendicular to longitudinal axis 42 and parallel to rear edge 78. Leading edge 82 is connected with first leg 44 at a rounded fillet 84 and is connected with the longitudinal extension 76 at a rounded fillet 86. In a mirrored manner on an opposite side of longitudinal axis 42, leading edge 82' is connected with second leg 46 via a rounded fillet 84' and is connected with longitudinal extension 76 via rounded fillet 86'. In one particular embodiment, leading edge 82 (and leading edge 82') are perpendicular to axis 42, but are offset therefrom so as to not intersect axis 42.

Accordingly, the rounded fillets 84 and 86 (and 84', 86') are additionally spaced from central axis 42. The longitudinal extension 76 continues forwardly from fillet 86 and includes a longitudinally extending edge 88 that is offset parallel to longitudinal axis 42. Longitudinal edge 88 is connected with a forward transverse edge 90 of the longitudinal extension 76 via a convexly rounded corner 92. Forward edge 90 transversely intersects longitudinal axis 42 in a perpendicular manner spaced forwardly from edge 82 on first rib 48. The longitudinal distance of the longitudinal extension 76 is measured from edge 82 (and 82') forwardly to transverse edge 90. In one particular embodiment, the longitudinally aligned width of longitudinal extension 76 is in a range from about 10 inches to about 20 inches. In one particular embodiment, the longitudinally aligned width of longitudinal extension 76 is 13%16 inches.

Second rib 50 is a rigid uniform member defining a trailing edge 94 and a leading edge 96. Trailing edge 94 is oriented transversely so as to intersect longitudinal axis 42 in a perpendicular manner. Edge 96 is parallel to trailing edge 94 to also intersect longitudinal axis 42 in a perpendicular manner. Edge 94 of second rib 50 extends between first leg 44 and second leg 46. More particularly, the edge 94 is connected with fourth portion 66D of first leg 44 at a concavely rounded fillet 98 effectuating the connection between trailing edge 94 and fourth portion 66D. Similarly, rounded fillet 98' connects the trailing edge 94 to the fourth portion 66D' of second leg 46. Collectively, trailing edge 94, fourth portion 66D, edge 82, edge 88, edge 90, edge 88', edge 82', and fourth portion 66D' define a first opening 100 that is generally C-shaped and extends fully through the supportive member 40. Leading edge 96 of second rib 50 is connected with third portion 66C of first leg 44 via a concavely rounded fillet 102. Similarly, leading edge 96 of second rib 50 is connected with third portion 66C' second leg 46 via a rounded fillet 102'.

Third rib 52 includes a trailing edge 104 and a leading edge 106. The trailing and leading edges 104, 106 of third rib 52 intersect longitudinal axis 42 in a perpendicular manner and extend transversely between the first leg 44 and the second leg 46. Trailing edge 104 is connected with third portion 66C via a concavely rounded fillet 108. Similarly, trailing edge 104 is connected with third portion 66C' of second leg 46 via a rounded concave fillet 108'. Collectively, trailing edge 104, third portion 66C, leading edge 96, and third portion 66C' define a second opening 110 which extends fully through the supportive member 40. Second opening 110 is positioned forwardly from first opening 100 and is generally rectangular in shape when viewed from above. The leading edge 106 on third rib 52 is connected with the second portion 66B of first leg 44 via a rounded concave fillet 112. Similarly, leading edge 106 on third rib 52 is connected with the second portion 66B' of second legs 46 via rounded fillet 112'.

Fourth rib 54 includes a trailing edge 114 and a leading edge 116. Trailing edge 154 perpendicularly intersects longitudinal axis 42 and extends transversely between the first leg 44 and second leg 46. Trailing edge 114 is connected with second portion 66B at a rounded concave fillet 118 and is connected with second portion 66B' at concave rounded fillet 118'. Leading edge 116, in one particular embodiment, is not parallel with trailing edge 114. In one particular embodiment, leading edge 116 is arcuately shaped in a concave manner such that the concave arc of trailing edge 116 faces forwardly. In one particular embodiment, the radius of curvature associated with leading edge 116 is quite large such that the intersection of leading edge 116 with longitudinal axis 42 approximates 90 degrees; however, it is slightly less than 90 degrees, but may be in a range of about 80-89 degrees given the large radius of curvature associated with the concave leading edge 116. Leading edge 116 is connected with first portion 66A of first leg 44 at a rounded concave fillet 118 and is connected with the second leg at rounded fillet 118'. The first portion 66A of first leg 44 extends forwardly to rounded edge 68 from the fillet 118. Similarly, first portion 66A' of second leg 46 extends forwardly to rounded leading edge 68' from the fillet 118'.

The transversely extending ribs are oriented in a manner such that the second rib 50 and the third rib 52 are positioned intermediate the first rib 48 and the fourth rib 54. The first rib 48 has a longitudinally aligned width from trailing edge 78 to leading edge 82 that is greater than longitudinally aligned widths of the second rib 50, the third rib 52, and the fourth rib 54. The width of second rib 50 is measured from the trailing edge 94 to the leading edge 96 along axis 42. The width of second rib 50 is less than that of first rib 48. In one particular embodiment, the longitudinally aligned width from trailing edge 94 to leading edge 96 is in a range from about three inches to about nine inches. In one particular embodiment, the width of second rib 50 is about five inches. In one particular embodiment, the longitudinally aligned width of third rib 52, which is measured from trailing edge 104 to leading edge 106, is identical to that of second rib 50. However, it is entirely possible for the longitudinally aligned width of third rib 52 to be greater or less than that of second rib 50. In another particular embodiment, the width of third rib 52 measured from trailing edge 104 to leading edge 106 is in a range from about three inches to nine inches, and in one particular embodiment, the width of third rib 52 is about five inches. With respect to fourth rib 54, the longitudinally aligned width measured from trailing edge 114 to the leading edge 116 varies pending on the transverse offset from longitudinal axis 42 because of the fact that leading edge 116 is concavely curved. Thus, the farther away from central axis 42, the fourth rib 54 has a greater longitudinal width. Thus, the narrowest portion of fourth rib 54 lies along axis 42 measured from trailing edge 114 to leading edge 116. Stated otherwise, the apex of the curve of leading edge 116 intersects longitudinal axis 42.

A third opening 120 is collectively defined by trailing edge 114 on the fourth rib 54, second portion 66B, leading edge 106 on third rib 52, and second portion 66B'. The third opening 120 is positioned forwardly from the second opening 110. Furthermore, the third opening is generally rectangular in shape when viewed from above, but has a longer longitudinal width oriented along axis 42 than the second opening 110. This is established because the distance between the third rib 52 and the fourth rib 54 is greater than the distance between the second rib 50 and the third rib 52.

A first interval distance 122 is defined between the first rib 48 and the second rib 50. A second interval distance 124 is defined between the second rib 50 and the third rib 52. A third interval distance is defined between the third rib 52 and the fourth rib 54. In one particular embodiment, the third interval distance 126 is greater than the second interval distance 124 and is greater than the first interval distance 122. Furthermore, in an additional particular embodiment, the first interval distance 122 is greater than the second interval distance 124. Additionally, an embodiment may provide where the second interval distance 124 is less than the first interval distance 122 and less than the third interval distance 126. Further, the second interval distance 122 may be less than the third interval distance 126. By way of example, the first interval distance 122 may be in a range of about 20 inches to about 30 inches. In one particular embodiment, the first interval distance 122 is about 26 9/16 inches. The second interval distance 124 may be in a range from about 20 inches to about 30 inches. In another particular embodiment, the second interval distance 124 is about 25 3/16 inches. The third interval distance 126 may be in a range from about 25 inches to about 35 inches, and in one particular embodiment, is about 30 10/16 inches. The overall longitudinally aligned width of supportive member 40 measured from first plane 72 to second plane 74 is about 121 inches. Furthermore, the transverse width of supportive member 50 measured from outer edge 64 on first leg 44 to outer edge 64' on second leg 46 is in a range from about 50 inches to about 60 inches, and in one particular embodiment, the width of supportive member 40 from spanning the outer edges is about 55 5/8 inches. The inner width measured from inner edge 66 on first leg 44 across longitudinal axis 42 to the inner edge 66' of second leg 46 may be in a range from about 40 inches to about 50 inches and in one particular embodiment, is about 45 11/16 inches.

Each of the first and second legs 44, 46 has a transversely aligned width measured from outer edge 64 to its respective inner edge 66 or 66'. The transversely aligned width of each of the legs 44, 46 is less than the transversely aligned length of each one of the ribs 48, 50, 52, and 54. Stated alternatively, the transversely aligned length of each one of the plurality of ribs is greater than a transversely aligned of each of one of the first and second legs 44, 46.

Figure 4:
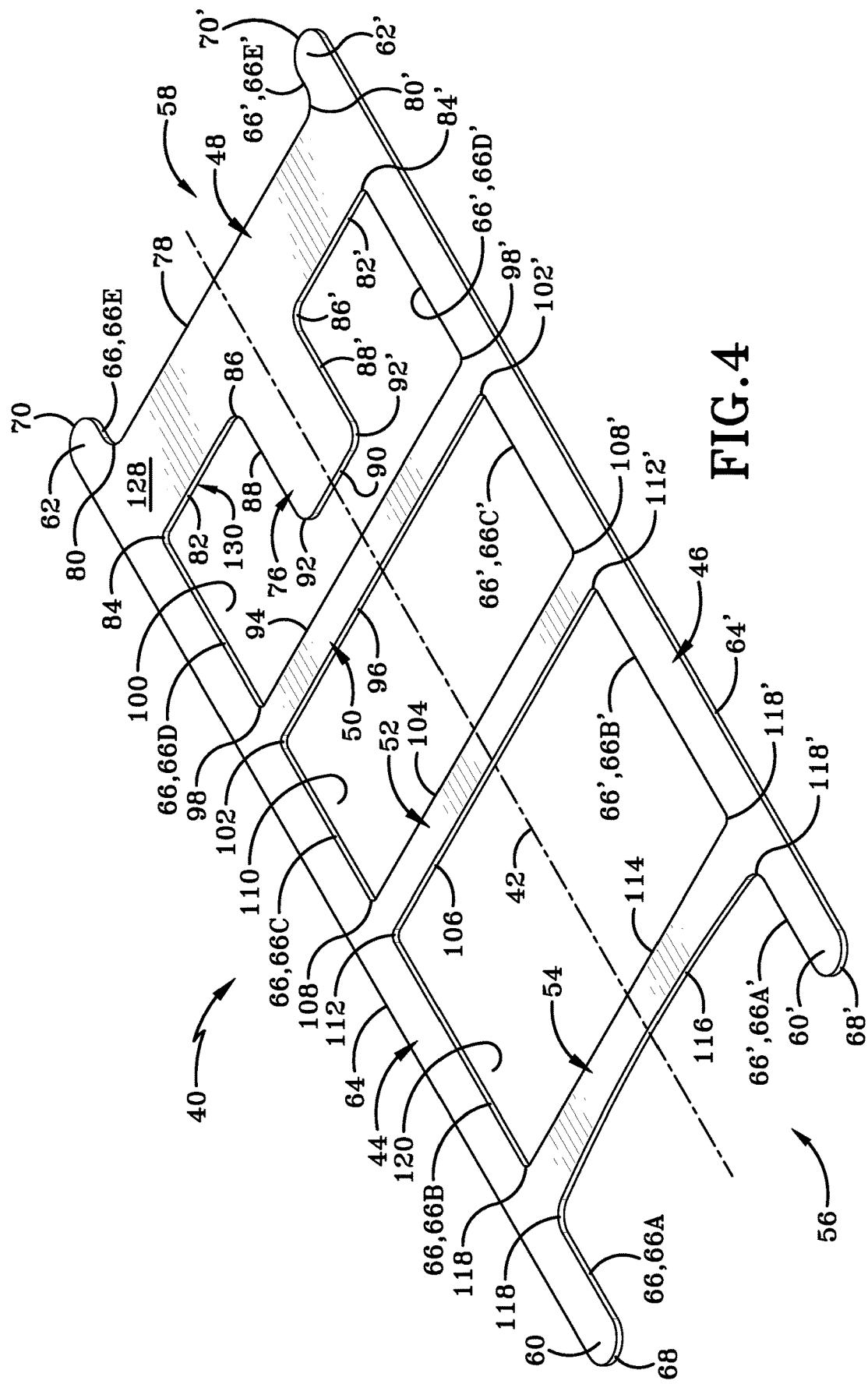
FIG. 4 is a top perspective view of the supportive member or belly pad when laid flat.
Figure 5:
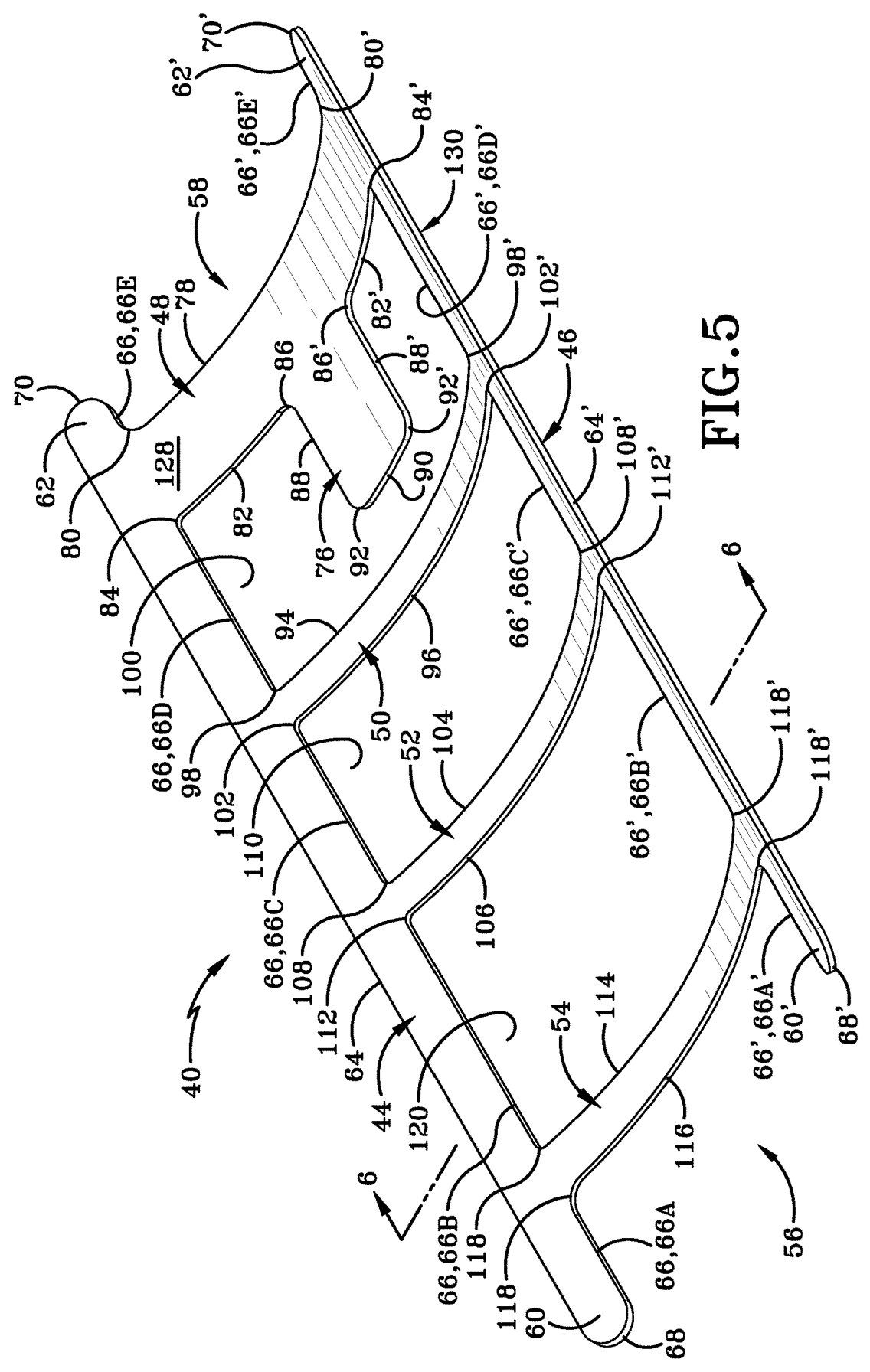
Figure 6:
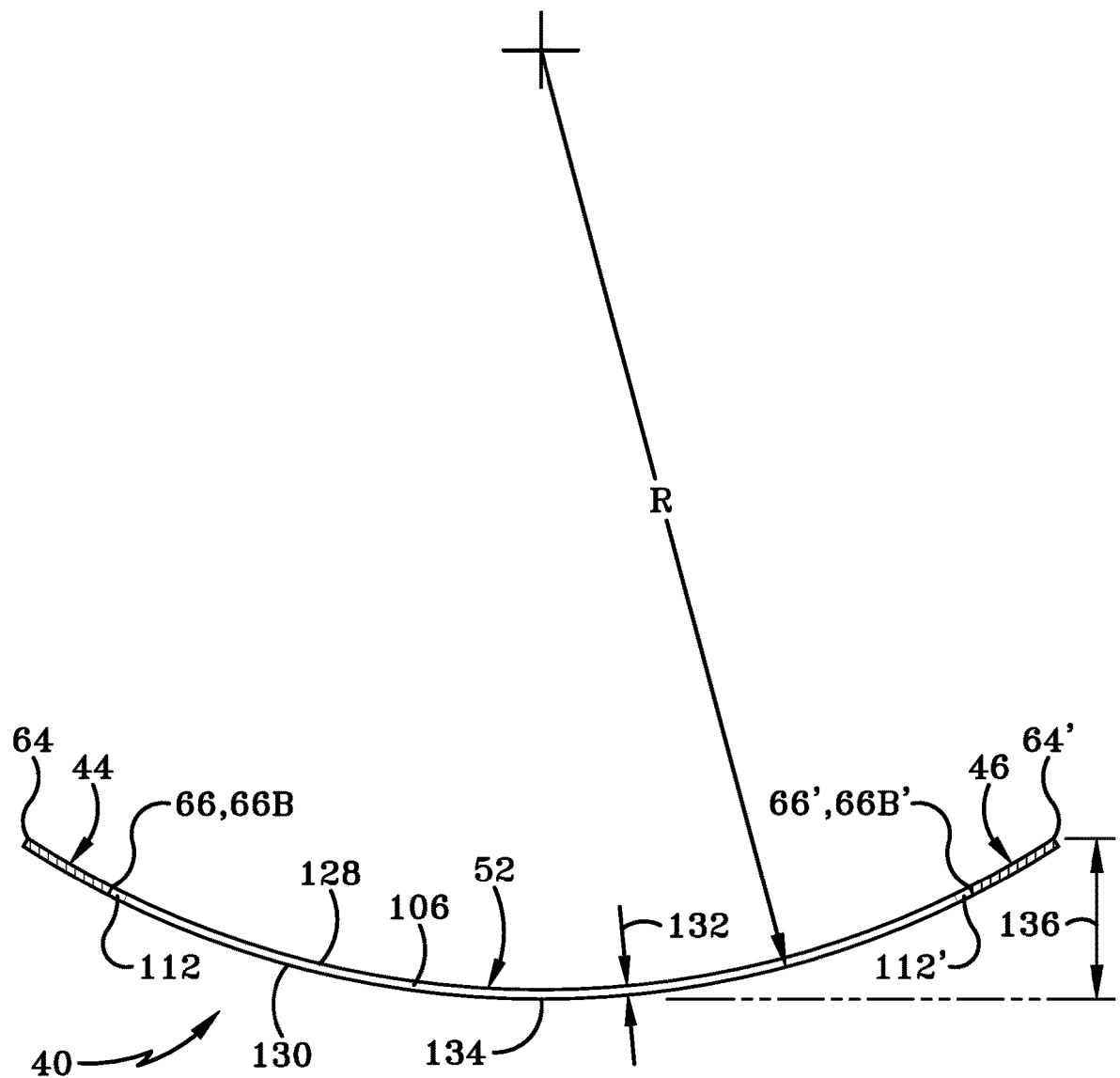
FIG. 6 is a cross section view taken along line 6-6 in FIG. 5 depicting the radius of curvature of the supportive member or belly pad.

FIG. 4, FIG. 5, and FIG. 6 depict generally the supportive member 40 at various stages of its manufacture. As depicted in FIG. 4, the supportive member is first fabricated from a planar sheet of rigid material so as to define an upwardly facing top surface 128 and a downwardly facing bottom surface 130 (FIG. 6). A thickness of the supportive member 40 is established between the top surface 128 and the bottom surface 130. The thickness of supportive member 40 may be in a range from about 0.1 inches to about one inch; however, in one particular embodiment, the thickness of supportive member 40 measured from top surface 128 to bottom surface 130 is about one-fourth inch. As mentioned previously, the supportive member 40 is positioned between the trailer body 24 and the trolley assembly 34. In order for the supportive member 40 to fit snuggly and sandwiched between the trailer body 24 and the trolley assembly 34, it must be curved in a manner complementary to that of the curved outer surface 25 of the trailer body 24. Accordingly, a rolling technique is applied to give a curvature to the supportive member 40. In one particular embodiment, the supportive member is fed transversely through a plurality of rollers to effectuate or impart a curvature, when viewed in transverse cross-section to the supportive member. The rolling of supportive member 40 may occur by inserting either one of the first leg 44 or the second leg 46 through the rollers and forcing the rest of the supportive member 40 through the rollers.

FIG. 5 and FIG. 6 depict the supportive member 40 after completing the rolling process. After being rolled, the supportive member has an arcuate cross-section as indicated in FIG. 6. More particularly, the top surface 128 is concavely curved and the bottom surface 130 is convexly curved. A radius of curvature R is established by the rolling process. Radius of curvature R for supportive member 40 may be in a range of about 40 inches to about 60 inches. In one particular embodiment, the radius of curvature of supportive member 40 is 48.5 inches. When viewed in cross-section, the center of the supportive member 40 has a lowermost point 134 which is located along the longitudinal center axis 42 intermediate the outer edges 64, 64' of the first leg 44 and second leg 46, respectively. When the supportive member 40 is curved in the manner shown in FIG. 6, the outer edges 64, 64' are located above the lowermost center point 134. Particularly, a vertical height 136 is established between the lowermost point 134 and the outer edges 64, 64', which are the vertical uppermost portions of the supportive member 40 after being rolled in the manner described above. In one particular embodiment, the height 136 of the supportive member 40 measured from the central lowermost point 134 to the outer edges 64, 64' is in a range from about six inches to about twelve inches. In one particular embodiment, the height 136 is about eight inches.

Figure 7:
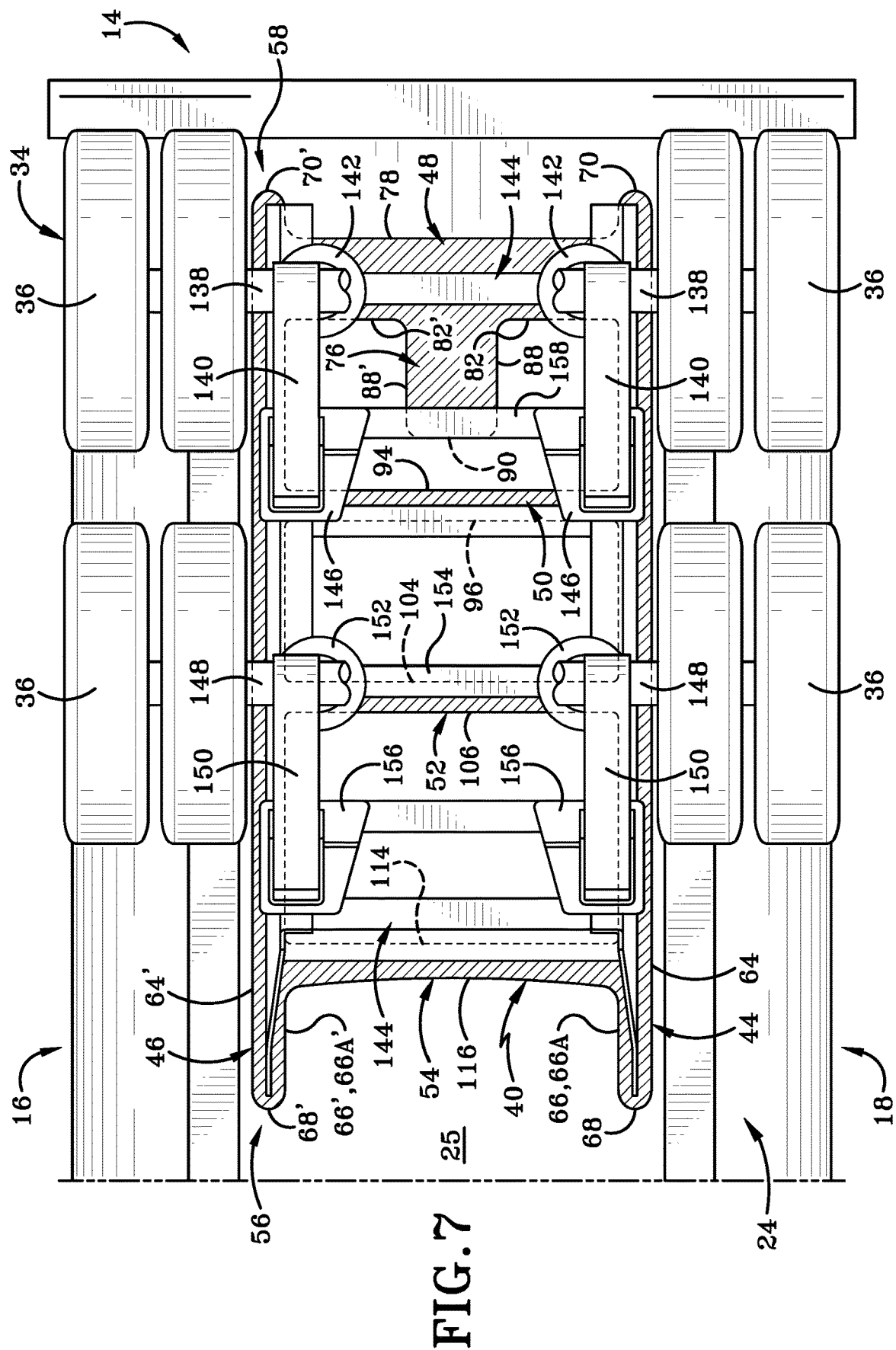
FIG. 7 is an assembled bottom plan view taken along line 7-7 in FIG. 1.

FIG. 7 depicts a bottom assembled plan view of the supportive member 40 from beneath the trailer 10. The supportive member 40 is shown as being arranged in order to support a plurality of trailing arms suspension components which are part of the trolley assembly 34. A rear axle 138 is positioned below first rib 48. Axle 138 is supported by trailing arms 140 which extend longitudinally below the first leg 44 and the second leg 46. Axle 138 is further supported by an air bag 142 which is located beneath first rib 48. The air bags 142 connect with a suspension frame member 144 which extends transversely below the first rib 48 between the first leg 44 and the second leg 46 such that the suspension frame member 144 is substantially parallel to first rib 48. A rear support flange 146 is positioned below the second rib 50 and pivotably connects with a forward end of the trailing arms 140. A forward second axle 148 extends below the third rib 52 in a manner substantially parallel thereto. The axle 148 is connected with trailing arms 150 which extend longitudinally in a manner parallel to first leg 44 and second leg 46. The axle 148 is further supported by air bags 152 which are connected with a suspension frame member 154. Suspension frame member 154 extends transversely in a manner substantially parallel to third rib 52. A forward end of the trailing arms 150 is supported by a support flange 156 which enable a pivotable movement of the trailing arms 150 respectively thereto.

A frame suspension member 158 may extend transversely relative to longitudinal axis 42 so as to be positioned below the longitudinal extension 76. A portion of frame suspension member 158 may be coplanar with transverse edge 90 of longitudinal extension 76. In one particular embodiment, the offset of trailing edge 78 on first rib 48 from the rear end 58 defined by rounded rear edge 70 on supportive member 40 may effectuate the assembly in a manner as shown in FIG. 7. Purposeful placement of edge 78 forwardly from rear rounded edge 70 may be beneficial in providing structural support to trailer 10 and particularly providing structural support for the connection between trolley assembly 34 and trailer body 24.

The openings 100, 110, 120 formed in the supportive member 40 are provided to reduce the overall weight thereof. It will be understood that the number and size of the openings has to be balanced with the strength requirements for support member 40 (which may also sometimes be referred to as a mounting plate). The configuration of support member 40 illustrated has resulted in the overall weight of the trailer being reduced by around 600 pounds over previously known trailer designs. This reduction in overall weight has two substantial benefits. Firstly, a lighter weight trailer will require less fuel to be consumed in order to move the trailer 10 over a roadway. Reduction in weight is also advantageous because additional load can be carried in trailer 10. The approximate 600 pounds of weight removed from the structure of the trailer 10 itself can be replaced with approximate 600 pounds of load.

All definitions, as defined and used herein, should be understood to control over dictionary definitions, definitions in documents incorporated by reference, and/or ordinary meanings of the defined terms.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto; inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The indefinite articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

An embodiment is an implementation or example of the present disclosure. Reference in the specification to "an embodiment," "one embodiment," "some embodiments," "one particular embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

The term "belly pad" as used herein refers to the supportive member 40 or mounting plate that is used to brace the belly area of the outer surface 25 of the trailer body. The belly area refers to the area near the longitudinal rear end and the transverse center of the half round trailer body 24.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the preferred embodiment of the disclosure are an example and the disclosure is not limited to the exact details shown or described.

The invention claimed is:

1. A trailer comprising:
   a trailer body having an inner surface opposite a convex outer surface aligned along a longitudinal center axis extending from a forward end to a rear end of the trailer body, and the trailer body having a longitudinal midpoint; and
   a supportive belly pad connected to the outer surface rearward of the longitudinal midpoint of the trailer body, wherein the supportive belly pad includes a pair of longitudinally extending legs and a plurality of transverse ribs orthogonally intersecting the longitudinal center axis, wherein the belly pad is arcuately curved complementary to the convex outer surface and couples ground engaging wheels to the trailer body proximate the rear end.

2. The trailer of claim 1, wherein the supportive belly pad further comprises:
   a top surface of the supportive belly pad that is concavely curved.

3. The trailer of claim 2, wherein the supportive belly pad further comprises:
   a bottom surface of the supportive belly pad opposite the top surface of the supportive belly pad, wherein the bottom surface engages the ground engaging wheels, and the bottom surface is convexly curved.

4. The trailer of claim 2, wherein the supportive belly pad further comprises:
   a radius of curvature of the top surface that is concavely curved, when viewed in cross section, that is in a range from about 40 inches to about 60 inches.

5. The trailer of claim 4, wherein the radius of curvature is in a range from about 45 inches to about 50 inches.

6. The trailer of claim 5, wherein the radius of curvature is about 48.5 inches.

7. The trailer of claim 1, wherein the supportive belly pad further comprises:
   a lowermost point that lies along the longitudinal center axis.

8. The trailer of claim 7, wherein the supportive belly pad further comprises:
   outermost edges on each respective longitudinally extending legs;
   wherein the outermost edges are at a greater height than the lowermost point;
   wherein the height between the lowermost point and the outermost edges is a vertical distance that is in a range from about 6 inches to about 12 inches.

9. The trailer of claim 8, wherein the vertical distance of the height is about eight inches.

10. The trailer of claim 1, wherein the plurality of transverse ribs further comprise:
    a transverse first rib on the supportive belly pad extending between the pair of longitudinally extending legs, wherein the first rib is offset forwardly from a plane intersecting rear ends of the pair of longitudinally extending legs;
    a transverse second rib positioned forwardly from the first rib on the supportive belly pad extending between the pair of longitudinally extending legs;
    a transverse third rib positioned forwardly from the second rib on the supportive belly pad extending between the pair of longitudinally extending legs;
    a transverse fourth rib positioned forwardly from the third rib on the supportive belly pad extending between the pair of longitudinally extending legs.

11. The trailer of claim 10, further comprising:
    a longitudinally aligned width of the first rib;
    a longitudinally aligned width of the second rib, wherein the width of the first rib is greater than the width of the second rib;
    a longitudinally aligned width of the third rib, wherein the width of the first rib is greater than the width of the third rib; and
    a longitudinally aligned width of the fourth rib, wherein the width of the first rib is greater than the width of the fourth rib.

12. The trailer of claim 10, further comprising:
    a first interval distance between the first rib and the second rib;
    a second interval distance between the second rib and the third rib;
    a third interval distance between the third rib and the fourth rib;
    wherein the second interval distance is less than the first interval distance and less than the third interval distance, and wherein the first interval distance is less than the third interval distance.

13. The trailer of claim 10, further comprising a longitudinal extension extending in a cantilevered manner along the longitudinal center axis a distance in a range from about 10 inches to about 20 inches from the first rib.

14. The trailer of claim 10, wherein the plurality of transverse ribs are offset from respective ends of the pair of longitudinally extending legs.

15. The trailer of claim 1, further comprising:
    wherein when the supportive belly pad is laid flat prior to installation on the trailer, the supportive belly pad comprises:
    a longitudinal center axis defining a longitudinal direction from a forward end to a rear end of the supportive member belly pad;
    a first leg of the pair of longitudinally extending legs having a first end and a second end;
    a second leg of the pair of longitudinally extending legs having a first end and a second end;
    wherein the first and second longitudinally extending legs are parallel and the longitudinal center axis of the belly pad is between the first and second legs;
    a transverse first rib of the plurality of transverse ribs extending between the first leg and the second leg;
    a longitudinal extension connected to the first rib and extending along the longitudinal center axis of the belly pad;
    a transverse second rib extending between the first leg and the second leg;
    a transverse third rib extending between the first leg and the second leg;
    a transverse fourth rib extending between the first leg and the second leg; and wherein the second and third ribs are intermediate the first and fourth ribs.

16. The trailer of claim 15, further comprising:

a transverse first plane perpendicularly intersecting the longitudinal center axis of the belly pad;

a transverse second plane perpendicularly intersecting the longitudinal center axis of the belly pad, wherein the respective second ends of the first and second legs lie along the second plane;

wherein the fourth rib is offset from the second plane;

a longitudinally aligned width of the first rib that is greater than a longitudinally aligned width of the second rib, and that is greater than a longitudinally aligned width of the third rib, and that is greater than a longitudinally aligned width of the fourth rib; a transversely extending concave edge on the fourth rib;

wherein the third rib is offset closer to the second rib than the third rib is to the fourth rib;

a first interval distance between the first rib and the second rib;

a second interval distance between the second rib and the third rib;

a third interval distance between the third rib and the fourth rib;

wherein the second interval distance is less than the first interval distance, wherein the second interval distance is less than the third interval distance.

17. The trailer of claim 16, further comprising:

a transversely aligned length of each one of the transverse first through fourth ribs, wherein the transversely aligned length of each one of the transverse first through fourth ribs is greater than a transversely aligned width of each one of the first and second legs;

a transverse first plane perpendicularly intersecting the longitudinal center axis of the belly pad, wherein a first end of the supportive belly pad lies along the first plane;

a transverse second plane perpendicularly intersecting the longitudinal center axis, the second plane at a position offset from the first plane, wherein a respective first end of the supportive belly pad lies along the first plane and a respective second end of the supportive belly pad lies along the second plane; and wherein the fourth transverse rib on the supportive belly pad is offset from the second plane.

18. A trailer comprising:

a trailer body having an inner surface opposite a convex outer surface aligned along a longitudinal axis extending from a forward end to a rear end of the trailer body, and the trailer body having a belly area near the rear end and a transverse center of the trailer body; and a supportive belly pad connected to the outer surface proximate the rear end of the trailer body, wherein the supportive belly pad includes a pair of longitudinally extending parallel legs and a plurality of transverse ribs orthogonally intersecting the longitudinal axis, wherein the belly pad is arcuately curved complementary to the convex outer surface, and the supportive belly pad only braces the belly area of the trailer body.

19. The trailer of claim 15 wherein the longitudinal extension connected to the first rib extends along the longitudinal center axis of the belly pad in a cantilevered manner a distance in a range from about 10 inches to about 20 inches.

* * * * *